United States Patent [19]
Varner

[11] 3,816,640
[45] June 11, 1974

[54] MULTITUBE CABLE SPLICE ASSEMBLY AND METHOD OF MAKING SAME

[75] Inventor: Wayne F. Varner, St. Paul, Minn.

[73] Assignee: Minnesota Mining and Manufacturing Company, St. Paul, Minn.

[22] Filed: July 12, 1973

[21] Appl. No.: 378,576

[52] U.S. Cl.................... 174/73 R, 29/628, 156/49, 174/88 R
[51] Int. Cl......................... H02g 15/08, H02g 1/14
[58] Field of Search............ 174/73 R, 73 SC, 84 R, 174/88 R, 88 C, 143; 29/628, 630 F; 156/49

[56] References Cited
UNITED STATES PATENTS

| | | | |
|---|---|---|---|
| 1,948,964 | 2/1934 | Gay | 174/73 R X |
| 3,382,308 | 5/1968 | Short | 174/73 R X |
| 3,485,935 | 12/1969 | Kreuger | 174/73 R X |
| 3,515,798 | 6/1970 | Sievert | 174/84 R X |
| 3,612,746 | 10/1971 | Sankey | 174/73 R |
| 3,656,084 | 4/1972 | Malia | 174/73 R UX |
| 3,717,717 | 2/1973 | Cunningham et al | 174/73 R |

*Primary Examiner*—Laramie E. Askin
*Attorney, Agent, or Firm*—Alexander, Sell, Steldt & DeLaHunt

[57] ABSTRACT

A cable splice assembly employed for joining a pair of shielded high voltage cables is formed from a number of elastomeric, coaxial inner tubes and an elastomeric, semiconductive outer tube that is coaxial with the inner tubes. Semiconducting portions and high dielectric strength insulating portions form the inner tubes with the semiconducting portions of adjacent inner tubes interleaved to serve as extensions of the cable shielding. At least one of the shield extensions electrically contacts the semiconductive outer tube to extend the cable shielding over the splice region.

8 Claims, 4 Drawing Figures

PATENTED JUN 11 1974   3,816,640

3,816,640

MULTITUBE CABLE SPLICE ASSEMBLY AND METHOD OF MAKING SAME

BACKGROUND OF THE INVENTION

1. Field of the Invention

The present invention relates in general to shielded high voltage electrical cables and more specifically to a splice assembly for such cables.

2. Description of the Prior Art

As a result of ever increasing consumer demand for electrical power, transmission and distribution systems for electrical energy require larger and larger capacity cables. Due to strong electrical fields associated with such cables, they require a thick insulation and outer shielding plus extreme care in manufacturing and installing. This is also true for an assembly employed to splice two high voltage cables together. Heretofore, the formation of such an assembly often required a three man crew over an eight hour day to complete.

As the need for splicing of high voltage cables has increased, various methods and assemblies for speeding up the splicing of high voltage cables have evolved, but there are primarily only three types of splice assemblies now in use, to wit: (1) self-vulcanizing rubber tape joints; (2) molded in the field polyethylene joints; and (3) molded in the field ethylene propylene rubber joints. Rubber tape joints are the most common presently in use, but are time consuming to prepare and, therefore, are impractical for making a large number of splices. Molded in the field joints may be quicker to make than tape joints, but can require relatively expensive and cumbersome portable molding presses. If only a small number of splices are to be made, an expenditure of this sort is not economically justified. Furthermore, the reliability of molded in the field joints cannot be assured before the system is energized.

Recently, a number of various splice assemblies having preformed elements have been developed to reduce the splicing procedure. However, the majority of these preformed splice assemblies are formed from insulating members that are fixed in size so that a particular sized assembly can be utilized only with a certain size cable; moreover, there is little interchangeability, if any, of the components between differently sized assemblies and such devices are limited to voltages less than 69 kv due to assembly forces involved. These deficiencies are only partially overcome by the splice assembly disclosed in a U.S. Pat. to Sankey, No. 3,612,746, which incorporates a heat shrinkable member that may be used with a narrow range of cables having minor variations in sizes. The present invention provides a splice assembly that significantly shortens the time required to make a splice and yet may be employed with a wide range of cable sizes.

SUMMARY OF THE INVENTION

The present invention provides a high voltage cable splice assembly having a connecting means for joining the conductors of two electrical cables, a plurality of coaxial inner tubes bridging between the cables and including insulating portions and semiconducting portions, and a semiconducting outer tube that is coaxial with the inner tubes.

In a first preferred embodiment the inner tubes are integrally formed with semiconductive end portions and central high dielectric strength insulating portions. The semiconducting end portions of adjacent inner tubes are interleaved to serve as extensions of the cable shielding, and the outer tube interconnects these shield extensions to complete a path of conduction between the cables.

A second preferred embodiment is specifically designed to accommodate cross bonding practices common to high voltage splice installations on three phase systems. The construction of the inner tubes and the outer tubes is similar to that of the first embodiment except for the addition of insulating end portions to the inner tubes, an insulating layer that is added to the exterior of the outer tube, and an intermediate tube coaxially interposed between the inner tubes and the outer tubes. The intermediate tube has an insulating portion that lies between the outer tube and one of the shield extensions formed by the semiconductive portions of the inner tubes, and this insulating portion positively breaks the path of conduction between the shieldings of the spliced cables. The intermediate tube also has insulating end portions and, accordingly, when the inner, outer, and intermediate tubes are arranged together they form an assembly with an entirely insulated exterior. The insulated exterior of the assembly insures that conductive impurities will not produce a short across the insulation, and since there is no electrical continuity between the shielding of the spliced cables, the various cable shields of the three phase system may be cross bonded.

The coaxial tubes of the present invention are formed from elastomeric compositions that permit them to be prestretched and placed on removable cores. During such prestretching, the diameter of the tubes may be substantially increased so that each of the tubes can readily be positioned in place to form a splice assembly of the present invention quickly and without frictional interference from the cables or other tube members. Once a tube is in position, the removable core is retracted and the tube will attempt to substantially return to its unstretched diameter. Each tube is designed to insure that its unstretched inside diameter is less than the outside diameter of the cables or particular coaxial tube on which it is positioned in order that the tubes do not completely return to their unstretched diameter, but will instead form a tight frictional fit with one another.

The elastomeric multitube construction of the present invention furnishes a splice assembly employable with a relatively wide range of cable sizes. To match the thickness of the assembly with the thickness of the insulation of particular cables the number of tubes of the assembly may be increased or decreased. Furthermore, many of the tubes for a particular range of cable sizes may be used in forming a splice assembly for a different range of cable sizes by changing the radial position of the tubes in the assembly.

Electrical stress in a splice may be minimized by an assembly of the present invention through the grading of the dielectric constants of the tubes forming the assembly to produce equal maximum stresses in each coaxial insulating member. This results in a substantially more linear voltage drop throughout the insulation in the splice region, and produces approximately a 20 percent reduction in maximum stress in comparison with that of an otherwise identical nongraded assembly.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of other embodiments, and reference is made to the claims herein for interpreting the breadth of the invention.

DESCRIPTION OF THE PREFERRED EMBODIMENTS

Figure 1:
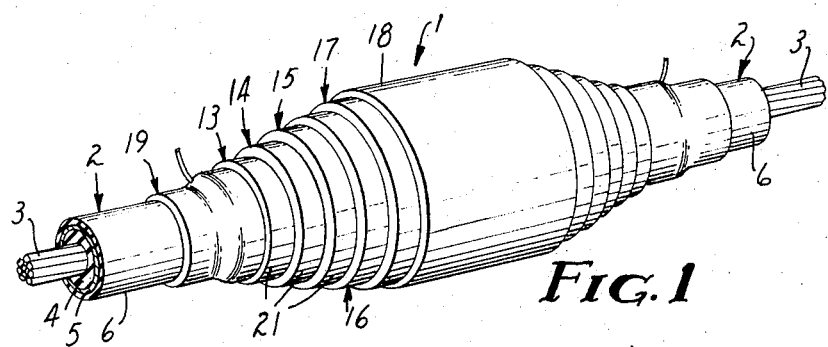
FIG. 1 is a perspective view of a cable splice assembly representing a first embodiment of the present invention as applied to a splice area between two high voltage cables.

With reference to the drawings, FIG. 1 illustrates a cable splice assembly 1 representing a first embodiment of the present invention that serves to splice together two typical high voltage shielded electrical cables 2 in a power distribution system. Splice assemblies of the present invention are particularly adapted to provide greatest advantages when employed for splicing together cables having voltage ratings of over 50 kv; but the concept of the present invention may also be advantageously applied for splicing lower voltage shielded cables. The splice assemblies described hereinafter are adapted for 69 kv cables such as have been increasingly used in underground electrical power distribution systems.

Figure 2:
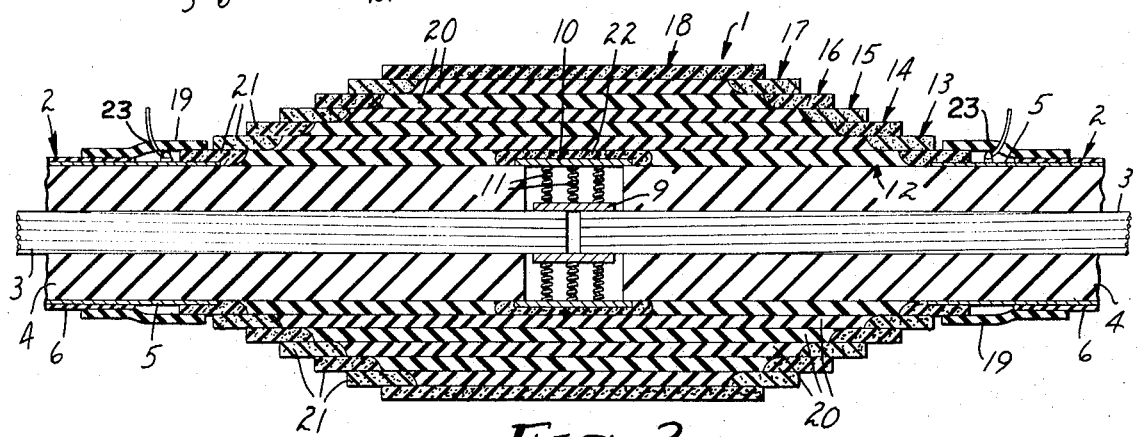
FIG. 2 is a longitudinal view in cross section of the assembly and cables of FIG. 1.

Referring now to both FIGS. 1 and 2, the 69 kv cables 2 are each primarily formed of an inner conductor 3 comprising a plurality of wires spirally wound, a thick insulating layer 4 surrounding the conductor 3, a shield 5 and an outer jacket 6 enclosing the shield 5. Such cables also may include a semiconducting tape layer between the conductor 3 and the layer 4, and between the layer 4 and the shield 5. Similar cable construction is used for a wide range of voltage classifications by the use of larger or smaller component parts in correlation to the voltage capacity desired. The splice assembly 1 may be used to serve as a reel end joint, coupling two 69 kv cables 2 or to repair failures in such cables.

The splice assembly 1 is formed of a connector 9 that serves as a means for axially joining the free ends of the cable conductors 3 together, a cylindrical support member 10 that is electrically shorted to the connector 9 by a number of spring straps 11 to equalize the voltage potentials of the connector 9 and the support member 10, a plurality of elastomeric, coaxial stress relief inner tubes 12–17, an elastomeric coaxial outer tube 18, and a pair of end sealing tubes 19.

Referring now solely to FIG. 2, each of the inner tubes 12–17 is integrally molded with high dielectric strength, axial insulating portions 20 and axial semiconductive end portions 21. In addition to the semiconductive end portions 21, the innermost tube 12 also has a central semiconductive portion 22 that overlies the connector 9 and support member 10 and serves to evenly distribute the electrical stress thereon. The end portions 21 of the tube 12 electrically contact the cable shields 5 of the cables 2. Although the tubes 12–17 are of differing lengths to define a tiered exterior, their semiconductive portions 21 are sufficiently wide to partially overlap and are interleaved to form extensions of the cable shielding 5. The outer tube 18 is entirely of a semiconductive composition and bridges between the shielding extensions formed by the semiconductive end portions 21 to complete the electrostatic shield from one end of the tube 12 to its opposite end whereby the cable shield 5 is operatively extended over the splice region.

The end sealing tubes 19 are also formed from an elastomeric material and span between the end portions 21 of the tube 12 and the jackets 6 of the cables 2 to close off the splice region. Each tube 19 has an orifice 23 through which a ground wire can be pulled to provide a solid ground for the cable shield 5.

Figure 4:
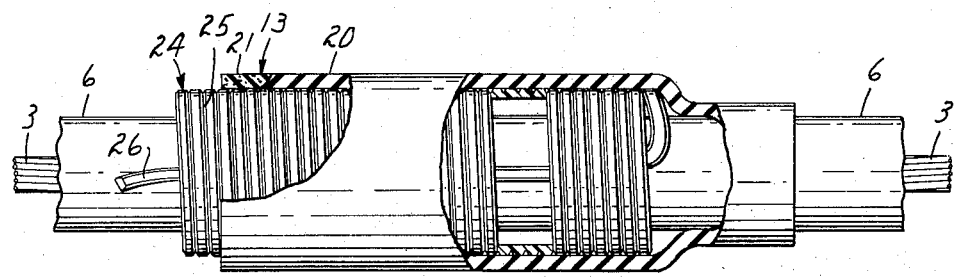
FIG. 4 is a plan view, with portions cut away, of one of the tubes forming the assembly of FIG. 1 shown prestretched and mounted on a removable core assembly.

The tubes 12–18 of the assembly 1 are not integral to one another, but instead are individually arranged on the cables 2 to bridge between the cables 2 and form the assembly 1. The elastomeric compositions of the tubes 12–19 permits them to be prestretched and placed on removable cores 24 as described in a U.S. Pat. to Sievert, No. 3,515,798, and assigned to the assignee of the present application. One such core 24 is shown in FIG. 4 partially supporting the tube 13 in a stretched condition. The core 24 is formed of a cylindrical shell that is helically grooved as at 25 so that the shell may be removed in the form of a strand 26 by unwinding from one end. During prestretching, the diameters of the tubes 12–19 are substantially increased and various sized cores 24 are employed so that each tube 12–19 can be easily positioned in place to form the assembly 1 quickly and without frictional interference between the tubes.

To make up a splice using the assembly 1, first the cables 2 must be prepared by cutting back the insulation, the shielding 5 and the jackets 6 of the cables 2 to expose the cable conductors 3. The tubes 12–19 and the support member 10 are then slid onto one or both of the cables 2 and the connector 9 is then used to electrically and mechanically join the conductors 3 together.

Next, the support member 10 is moved into position to preferably overlap the ends of the insulation 4 of the cables 2. The support member 10 is formed from a stiff, electrically conductive material and serves to close the gap that exists between the insulation 4 of the cables 2, thereby preventing the elastomeric tubes 12–18 from collapsing therein. It is not essential that the member 10 overlap the ends of the insulation 4 and may be of such a size to lie between the ends of the insulation 4. Moreover, the connector 9 and member 10 may be formed integrally in a unitary construction. The member 10 is electrically connected to the cable conductors 3 by a plurality of spring straps 11 attached to the connector 9. Accordingly, even though the gap between the insulation 4 of the cables 2 is filled with air, there is no electrical stress or voltage gradient imposed across this air gap because of the direct electrical contact between the member 10 and connector 9. Furthermore, the straps 11 also serve as thermal conductors to convey heat away from the connector 9.

With the member 10 correctly in position, each tube 12–18 is successively slide into place in the assembly 1 and each core 24 on which each tube 12–18 is mounted is removed. Since each of the tubes 12–18 is prestretched on a relatively large core 24, the unstretched inside diameters of the tubes 12–18 are not critical dimensions. All that is required is that the diameters of each tube 12–18 should be sufficiently small so that as the cores 24 of the tubes 12–18 are removed, the tubes will shrink sufficiently to form a frictional fit with an adjacent tube. Thus, when the tubes 12–18 are in place with their cores 24 removed they operatively form an integral unit.

To complete the assembly 1, it is then merely necessary to fix the end seal tubes 19 at each end of the tube 12 to span between the ends of the tube 12 and the jackets 6 of the cables 2. Alternatively the end of the assembly 1 may be sealed by a tape wrap on each end.

Figure 3:
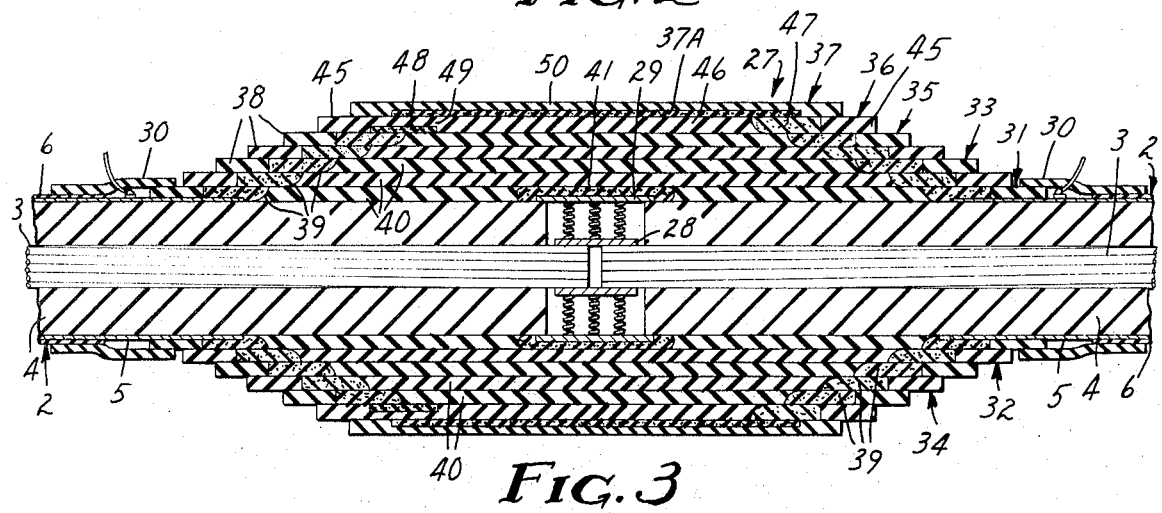
FIG. 3 is a longitudinal view in cross section of a cable splice assembly representing a second embodiment of the present invention as applied to a splice area between two high voltage cables.

Referring now to FIG. 3, a splice assembly 27 represents a second embodiment of the present invention shown joining the cables 2. The assembly 27 has a tubular construction resembling that of the assembly 1, with a connector 28, support member 29, two end sealing tubes 30, five inner tubes 31–35, an intermediate tube 36, and an outer tube 37.

Each of the inner tubes 31–35 differs from those of the assembly 1 only in that they have first insulating end portions 38 instead of semiconducting portions for a purpose to be hereinafter discussed. Axially inward from the insulating portions 38 of the inner tubes 31–35 are semiconductive portions 39 and second insulating portions 40. In addition, the innermost tube 31 has a central semiconductive portion 41 to eliminate high electrical stresses that would otherwise be caused by the member 29. Just as in the assembly 1, the semiconductive portions 39 are interleaved and electrically connect with the cable shielding 5 to form extensions thereof; also the outer tube 37 has an inner semiconductive layer 37A that extends over the splice region.

Coaxially interposed between the outer tube 37 and the inner tube 35 is the intermediate tube 36 that has insulating end portions 45, a central insulating portion 46, and a semiconducting portion 47 near one end and electrically connecting between one of the portions 39 of the tube 35 and the outer tube 37 to connect the extension of the cable shielding formed by the semiconducting portions 39 on that side of the assembly 27 with the tube 37. At the opposite end of the tube 36 is a semiconducting portion 48 that is only about half the thickness of the tube 36. Accordingly, there is an insulating gap 49 between the outer tube 37 and the semiconducting portion 48 to define an electrical break between the semiconducting portion 37A of the outer tube 37 and the extension of the cable shielding 5 on that side of the assembly 27. To make certain that the gap 49 is not electrically shorted by impurities, the outer tube 37 has an insulating layer 50 that coacts with the insulating portions 38 of the inner tubes 31–35 and the insulating portions 45 of the intermediate tube 36 to define an insulating exterior for the assembly 27. The incomplete circuit between the cable shielding extensions of the assembly 27 is particularly useful for employment in three phase electrical systems because it is often desirable to cross bond the shields of a cable for a three phase system to substantially eliminate induced shield currents while maintaining the electrostatic shield substantially complete. The tubes of the assembly 27 are adapted to be prestretched and positioned together in similar fashion to the assembly 1.

As described above, each of the assemblies 1 and 27 is composed of a number of elastomeric tubes, and there are certain common dimensional parameters associated with these tubes. The first is "residual tube thickness" which is defined herein as the tube wall thickness of each of the tubes of the assemblies 1 and 27 when in place on the splice. The residual tube thickness is important in assuring an adequate insulating buildup. The second dimensional parameter is "residual stretch" which is the percentage of stretch remaining after the tube is in position on the splice minus a maximum permanent set allowance. The tubes of the assemblies 1 and 27 should have sufficient residual stretch that they tightly clamp onto one another to operatively form integral units. The last dimensional parameter is "clearance." It is important for proper assembly to insure that adequate clearance exists between the cable jackets 6 and the removable cores 24 of the tubes 12, 19, 30 and 31, and also between the outside diameter of each of the other tubes and each respective core 24 of an adjacent tube. The tubes of the disclosed embodiments have a residual tube thickness of 0.200 inch, a minimum residual stretch of 5 percent and a minimum clearance of 0.100 inch.

The multitube construction of the assemblies 1 and 27 is particularly advantageous for reducing electrical stress in the splice region because the dielectric constants of each of the tubes may be selected to produce equal maximum stresses in each insulating tube. A substantially linear voltage drop throughout the insulation in the splice region is thus obtained and as a result produces a 20 percent reduction in maximum stress as compared with an otherwise identical nongraded assembly.

The elastomeric tubes that form the present invention may be of various compositions of materials. Mechanical properties that these materials must have include strong intercomponent bonds, low modulus, low permanent set, high tear resistance, and good injection molding properties such as flow, cure time, and release. The insulating portions of each of the tubes should also have the electrical properties of high dielectric strength, low dissipation factor, and precisely determinable dielectric constants. The semiconductive portions of each tube should include the electrical property of a low, stable volume resistivity.

What I claim is:

1. A cable splice assembly electrically and mechanically interconnecting shielded high voltage electrical cable ends, which assembly comprises:

an electrically conducting cable connecting means that axially joins the electrical conductors of said ends;

a plurality of elastomeric, coaxial, inner, stress relief tubes bridging between said cables and overlying said connecting means, said tubes integrally including axial, high dielectric strength insulating portions and axial semiconducting portions, which semiconducting portions of adjacent inner tubes are interleaved to serve as extensions of the electrostatic shielding of said cables; and an elastomeric semiconductive outer tube coaxial with said inner tubes and electrically connecting with at least one of said extensions of said shielding to form with the inner tubes an electrostatic shield over the splice region.

2. A splice assembly as recited in claim 1 wherein said outer tube electrically connects with said extensions of said shielding to complete a path of conduction between the shields of said cables.

3. A splice assembly as recited in claim 1 wherein said assembly further includes:

an intermediate tube coaxially interposed between said inner tubes and said outer tube and having a semiconducting portion electrically connecting one of said shield extensions with said outer tube and an insulating portion that forms an electrical break between the other shield extension and said outer tube; and wherein each of said inner, outer and intermediate tubes has insulating portions forming an insulating cover over said assembly preventing impurities from producing an electrical short across said break.

4. A splice assembly as recited in claim 1 wherein each of said inner and outer tubes has a frictional fit with another of said tubes to operatively form an integral unit.

5. A splice assembly as recited in claim 1 wherein said insulating portions of said inner tubes are central portions and said semiconducting portions of said inner tubes are end portions.

6. A splice assembly as recited in claim 1 wherein there is a gap between the insulation of said cables and said assembly further includes:

a stiff, electrically conducting support member closing the gap between the insulation of said cable segments and preventing said elastomeric tubes from collapsing into said gap; and an innermost tube of said inner tubes has a central semiconducting portion overlying said support means to evenly distribute electrical stress produced by said support means.

7. A cable splice assembly electrically and mechanically interconnecting two segments of a shielded and insulated high voltage electrical cable, which splice comprises:

an electrically conducting cable connecting means that joins one end of the electrical conductors of each segment axially together;

a plurality of elastomeric, coaxial, inner, stress relief tubes bridging between said cable segments and enshrouding said connecting means, said tubes integrally including high dielectric strength insulating portions and semiconducting portions, which semiconductive portions of adjacent tubes are interleaved to serve as extensions of the electrostatic shielding of said segments; and an elastomeric, semiconductive, outer tube coaxial with said inner tubes and electrically connecting said extensions of said shielding to complete the electrostatic shield between the shielding of said segments.

8. A method for forming a cable splice assembly for electrically and mechanically interconnecting two jacketed shielded and insulated high voltage cables, which method comprises the steps of:

1. cutting back the jacket, insulation, and shielding of said cables;
2. slipping onto at least one of the cables inner elastomeric tubes having semiconducting portions and insulating portions and an elastomeric semiconducting outer tube, which tubes are prestretched and mounted on removable cores of various diameters;
3. connecting the conductors of said cables with connecting means; and
4. successively positioning each of said inner and outer tubes into a coaxial relationship with one another and thereupon removing each of said tube cores to permit said tubes to shrink and form a frictional fit with an adjacent tube to operatively form an integral unit, with the semiconductive portions of adjacent inner tubes interleaved to serve as extensions of the electrostatic shielding of said cable and with the outer tube electrically connecting with at least one of said extensions of said shielding to form with the inner tubes an electrostatic shield over the splice region.

* * * * *